United States Patent [19]
Rhebergen

[11] Patent Number: 5,243,630
[45] Date of Patent: Sep. 7, 1993

[54] METHOD OF AND ARRANGEMENT FOR GENERATING A CLOCK SIGNAL FROM A BIPHASE MODULATED DIGITAL SIGNAL

[75] Inventor: Gertjan Rhebergen, Huizen, Netherlands

[73] Assignee: U. S. Philips Corporation, New York, N.Y.

[21] Appl. No.: 694,582

[22] Filed: May 2, 1991

[30] Foreign Application Priority Data

Jan. 16, 1991 [NL] Netherlands .................. 9100065

[51] Int. Cl.⁵ .................. H04L 7/00; H04L 7/02; H04L 7/06
[52] U.S. Cl. .................. 375/106; 375/110; 375/113; 375/118
[58] Field of Search .................. 375/94, 95, 110, 113, 375/120, 118, 106

[56] References Cited

U.S. PATENT DOCUMENTS

| | | | |
|---|---|---|---|
| 4,253,185 | 2/1981 | Danielsen | 375/110 |
| 4,429,406 | 1/1984 | Hale | 375/113 |
| 4,709,378 | 11/1987 | Wouda et al. | 375/110 |
| 4,796,280 | 1/1989 | Nesin et al. | 375/110 |
| 4,809,304 | 2/1989 | Chau | 375/110 |
| 4,872,155 | 10/1989 | Yokogawa et al. | 375/113 |
| 4,972,161 | 11/1990 | Davies et al. | 375/120 |
| 5,001,728 | 3/1991 | Fuldner | 375/82 |
| 5,056,114 | 10/1991 | Wright | 375/110 |
| 5,105,447 | 3/1992 | Iwane | 375/110 |

*Primary Examiner*—Curtis Kuntz
*Assistant Examiner*—Vijay Shankar
*Attorney, Agent, or Firm*—David R. Treacy

[57] ABSTRACT

A clock signal is generated by taking two samples in each symbol interval T with a mutual distance of about ¼ T, shifting the two instants in the symbol interval while keeping a fixed mutual distance between them until a first sampling instant has reached a zero, the second sampling instant then being at a minimum or a maximum, the polarity of the second sample indicating the information content of the biphase signal in this interval. When the first sampling instant has reached the zero, the first sampling instant is moved alternately to the left and right of the zero, and the second sampling instant is retained in its place without jitter.

11 Claims, 3 Drawing Sheets

METHOD OF AND ARRANGEMENT FOR GENERATING A CLOCK SIGNAL FROM A BIPHASE MODULATED DIGITAL SIGNAL

BACKGROUND OF THE INVENTION

The invention relates to a method of generating a clock signal from a biphase modulated digital signal whose polarity is sampled in each symbol interval at a first and a second sampling instant at which instants the two polarity samples are compared with each other and a control signal in one sense is generated if there is equality of the polarity samples in response to which the two sampling instants are shifted relative to the biphase signal in a first direction, and if there is unequality of the polarity samples a control signal in the other sense is generated in response to which both sampling instants are shifted relative to the biphase signal in a second direction.

A method of this type is known from EP-A-0 162 505 (U.S. Pat. No. 4,709,378).

A symbol interval having length T of a biphase-modulated signal always has a phase transition halfway the interval, which phase transition is perceptible as a zero crossing if the maximum value of the biphase signal is positive and the minimum value is negative. At a distance of $\frac{1}{4}$ T both to the left and right of this zero crossing the amplitude of the biphase signal presents a maximum (positive or negative) value and is a measure for the information content of the biphase signal in the symbol interval concerned. Hereinafter it will be assumed that the polarity of the maximum amplitude of the biphase signal is to be determined at a distance of $\frac{1}{4}$ T to the left of the zero crossing. For the invention it does not matter at all whether this is effected to the left or right of the zero crossing.

In order to be in a position to establish the polarity of the maximum amplitude of the biphase signal in each symbol interval at a distance of T/4 to the left of the zero crossing, the biphase signal is to be sampled in the place of this maximum amplitude in each symbol interval. Since establishing the position of the maximum amplitude is much more difficult than establishing the position of the steep zero crossing, the biphase signal is sampled in each symbol interval at two instants which are mutually T/4 apart. If the second sampling instant coincides with the zero crossing, the first sampling instant will coincide with the maximum amplitude of which the polarity is to be determined.

By comparing the two polarity samples with each other and shifting these instants slightly to the right when they are equal and slightly to the left when they are unequal, after a number of symbol intervals the position of the second sampling instant will come in the neighbourhood of the zero crossing. The time required to this end is called the adjusting time. If the second sampling instant is then situated slightly to the left of the zero crossing, the two polarity samples are equal and the two sampling instants are shifted to the right so that in the next symbol interval the second sampling instant ends up slightly to the right of the zero crossing, whereas the first sampling instant is still situated to the left of the zero crossing in the neighbourhood of the maximum amplitude. The polarity samples taken at these instants will then be different so that both instants will be shifted to the left and the second sampling instant will again end up to the left of the zero crossing in the next symbol interval, and so on.

The two sampling instants continue to be shifted to the left and right while retaining a mutual distance of T/4 once the second sampling instant has been situated in the neighbourhood of the zero crossing. The first sampling instant then presents a jitter extending across the step size with which both sampling instants are shifted back and forth. For example, in digital echo cancelling systems the jitter is required to have a maximum of one thousandth part of the symbol interval. Such a small jitter could be realised by selecting the step size to be equally small, whereas the adjusting time then becomes inversely proportionally large. This is undesirable.

It is an object of the invention to provide a method according to which the first sampling instant does not present any more jitter after the adjusting time, without the adjusting time increasing.

SUMMARY OF THE INVENTION

The method according to the invention is characterized in that in dependence on a current value and at least one previous value of the control signal the first sampling instant retains a fixed position relative to the biphase signal, whereas the second sampling instant is shifted relative to the biphase signal.

By determining the end of the adjusting time on the basis of a current value and at least one previous value of the control signal, while the second sampling instant has reached the neighbourhood of the zero crossing, and by allowing this second sampling instant to move on the left and right of the zero, while the first sampling instant retains a fixed position relative to the biphase signal, it is achieved that the first sampling instant no longer presents any jitter. Even minor variations during the period of the biphase signal can be eliminated completely by the shifting of the second sampling instant. If these variations become too large, adjustments are again to be made during which adjustments the two sampling instants, mutually approximately $\frac{1}{4}$ T apart, are again shifted until the second sampling instant has reached the neighbourhood of the zero crossing.

The method according to the invention thus knows two states: a first, dynamic adjustment state in which the two sampling instants have a mutual distance of approximately T/4, which first state of dynamic adjustment ends when the second sampling instant has reached the neighbourhood of the zero crossing, and a second, static adjustment state in which the first sampling instant retains a fixed position while the second sampling instant moves on the left and right of the zero.

An embodiment of the method according to the invention is characterized in that the second sampling instant coincides with an instant from a group of instants which are predetermined relative to the first sampling instant.

If the second sampling instant coincides with an instant from a group of predetermined instants, for example, a, b and c, the second sampling instant is to coincide with instant b during the dynamic adjustment state. In the static adjustment state the second sampling instant can then move on the left and right of the zero by alternately coinciding with one of the instants a, b and c.

The invention further relates to an arrangement for implementing the method, comprising:
sampling means for sampling the polarity of the biphase modulated digital signal at the first and second sampling instants in each symbol interval, having an input to which the biphase signal may be applied, a control input and an output;

comparator means for comparing the two polarity samples and generating the control signal in response thereto, having an input coupled to the output of the sampling means and having an output;

a frequency controlled oscillator having an input coupled to the output of the comparator means and having an output; and generator means for generating a pulse at the first and second sampling instants, having an input coupled to the output of the oscillator, a control input coupled to the output of the comparator means and having an output coupled to the control input of the sampling means, the signal applied to the control input of the generator means being decisive as to the direction in which the two pulses are shifted relative to the biphase signal.

The arrangement according to the invention is characterized, in that the arrangement further includes control means, comprising:

a first input coupled to the output of the comparator means, for receiving the control signal;

a second input coupled to the output of the generator means, for receiving the pulses;

a first output coupled to the control input of the generator means, for realising the coupling of the comparator means to the generator means;

a second output coupled to the control input of the sampling means, for supplying the pulse at the second sampling instant; and a memory circuit coupled to the first input, for generating a signal at the first output in dependence on an actual value and at least one previous value of the control signal, in response to which output signal the generator means generates the pulse at the first sampling instant which instant has a fixed position relative to the biphase signal, and generates a signal at the second output, for supplying the pulse at the second sampling instant which instant has a position shifted relative to the biphase signal.

An embodiment of the arrangement according to the invention is characterized in that the memory circuit comprises at least a combinatorial circuit and a flip-flop, of which flip-flop an input forms the first input of the control means via the combinatorial circuit;

an output forms the first output of the control means via a logic circuit and is coupled to the second output of the control means; and a input "clock" is coupled to the output of the generator means.

BRIEF DESCRIPTION OF THE DRAWINGS

The invention will be further explained on the basis of an exemplary embodiment represented in the drawing Figures in which the components denoted by like reference characters are identical in the Figures, in which.

DETAILED DESCRIPTION OF THE PREFERRED EMBODIMENTS OF THE INVENTION

Figure 1:
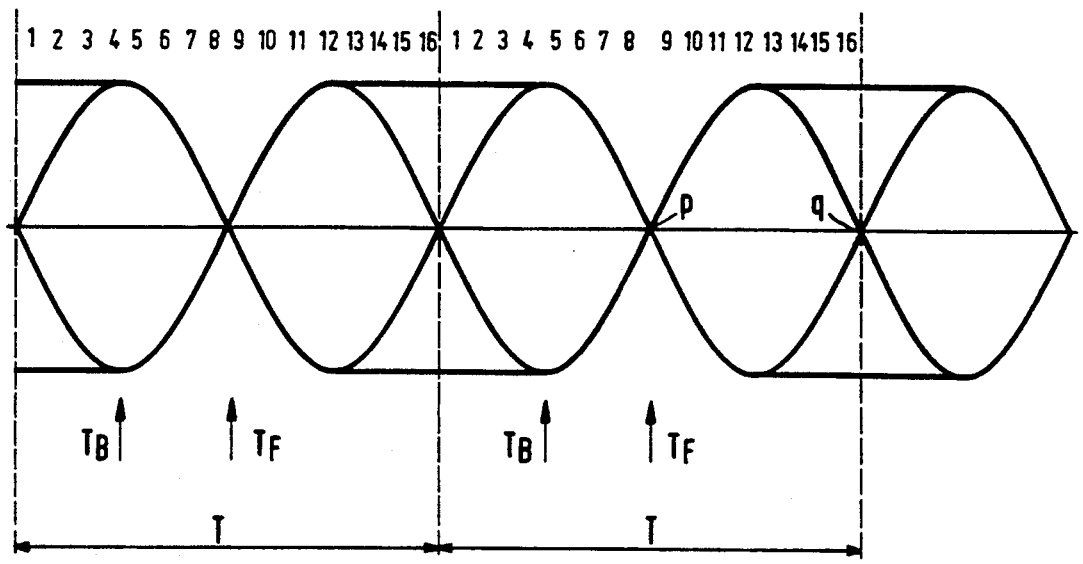
FIG. 1 shows the characteristic eye pattern of a biphase coded signal.

FIG. 1 shows the eye pattern of the biphase signal. In each symbol interval of length T a received biphase signal has a zero p that always occurs irrespective of the information content of the signal and a zero q that occurs only when the signal has specific information content. The second sampling instant $T_F$ is to coincide with the zero p so that at the time of the first sampling instant $T_B$ (which is approximately T/4 to the left of $T_F$ in the symbol interval) the information content of the biphase signal in the symbol interval concerned can be determined. In order to avoid that with a specific information content of the biphase signal, $T_F$ coincides with the zero q, a false synchronisation detector can be used, as described in EP-A-0 162 505 (U.S. Pat. No. 4,709,378). This detector has been omitted from the exemplary embodiment for simplicity.

Figure 2:
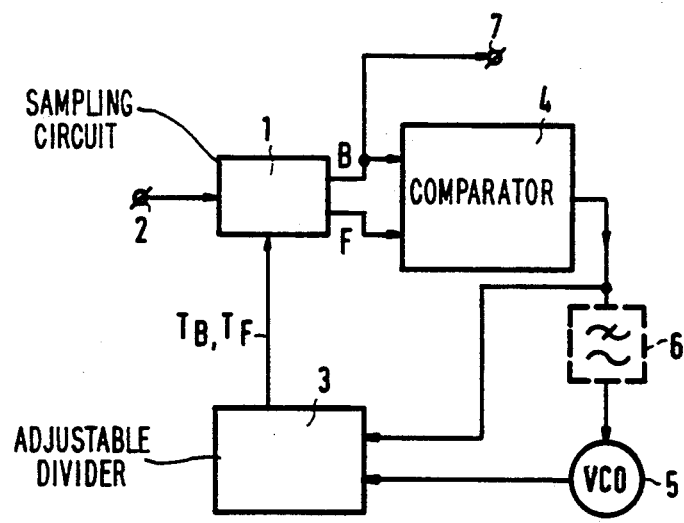
FIG. 2 shows a block diagram of a receiver for biphase coded signals.

In FIG. 2 the represented block diagram of a prior art receiver for biphase signals comprises a sampling circuit 1 to which the biphase signal is applied through input terminal 2 and which is connected to adjustable divider 3. Divider 3 generates the sampling instant signals destined for sampling circuit 1 at instants $T_B$ and $T_F$. The polarity samples obtained at these instants are applied to comparator circuit 4 which, in response, generates a control signal for adjustable divider 3 and for a frequency controlled oscillator 5 (usually through low-pass filter 6). The oscillator signal originating from oscillator 5 is also applied to adjustable divider 3. If the frequency of the oscillator signal is higher, for example, by a factor of 16 than the symbol interval rate, the divider 3 divides this oscillator frequency by a factor of 15 or by a factor of 17 depending on the control signal. Consequently, the two sampling instants will be shifted to the left or to the right respectively, and after some time $T_F$ will be situated in the neighbourhood of the zero p. Subsequently, adjustable divider 3 will alternately continue to divide by 15 and 17 so that $T_F$ continues to move to the left and right of the zero p ("idle" state). $T_B$ continues to move along with $T_F$ at a specific distance therefrom and thus presents a jitter amounting to 1/16 of the symbol interval. Such a large jitter is undesirable.

Figure 3:
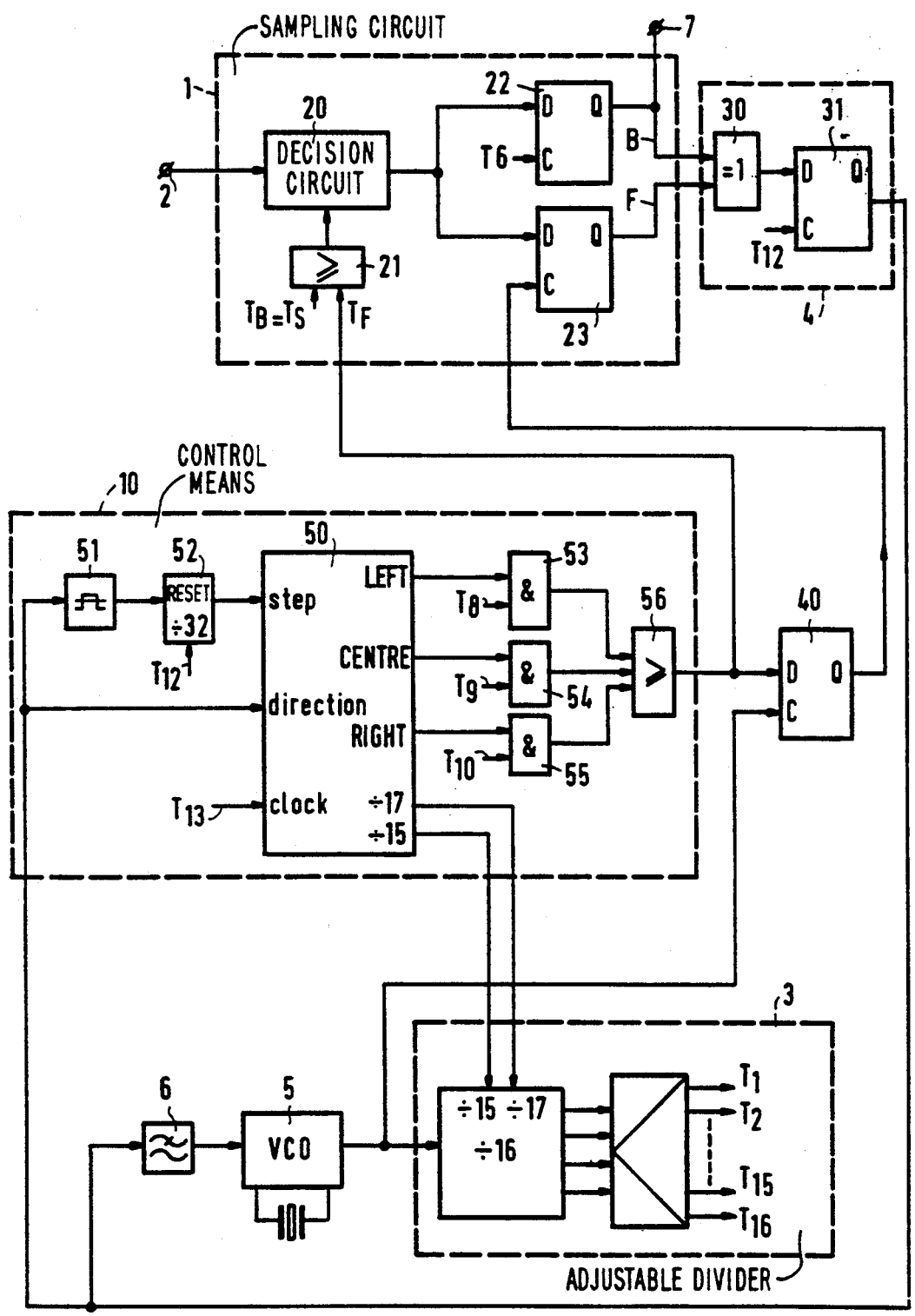
FIG. 3 shows a block diagram of an exemplary embodiment of the arrangement according to the invention.

Sampling circuit 1 in FIG. 3 comprises decision circuit 20 whose input is connected to input terminal 2 for the biphase signal to be supplied. Decision circuit 20 decides at the sampling instants $T_B$ and $T_F$, which are supplied via OR-gate 21, whether the biphase signal at these instants is positive (logic "one") or negative (logic "zero"). The two polarity samples are stored in the respective D flip-flops (DFF) 22 and (DFF) 23. The output of DFF 22 is connected to output terminal 7 on which the information content of the biphase signal appears. The outputs of the DFF 22 and DFF 23 constitute the outputs of sampling circuit 1 and are connected to the inputs of EXOR gate 30 of comparator circuit 4 which circuit further includes a DFF 31 for the output signal of EXOR gate 30 to be stored. The output of DFF 31 constitutes the output of comparator circuit 4. The signal on this output has the logic value "one" if the two polarity samples are different and the logic value "zero" if they are equal and is applied through low-pass filter 6 to the frequency-controlled oscillator (VCO) 5 and to control means 10.

VCO 5 generates a signal with a frequency that is higher by a factor of 16 than the symbol interval rate. Adjustable divider 3 connected to VCO 5 divides the oscillator frequency by a factor of 16, or by a factor of 15 or 17, depending on the control signals coming from the control means 10. Furthermore, adjustable divider 3 generates 16 equidistant pulses T1 to T16 per time period of the signal obtained by means of the divider. Pulse T5 (corresponding to the sampling interval $T_B$) is applied to OR gate 21, pulse T6 to the input "clock" of DFF 22 and pulse T12 to the input "clock" of DFF 31.

The output of control means 10 is connected to OR gate 21 for the feeding of sampling instant $T_F$ and is connected to the input of DFF 40 for the storage of $T_F$. The output of DFF 40 is connected to the input "clock" of DFF 23 and the input "clock" of DFF 40 is connected to VCO 5. This achieves that irrespective of the moment at which the sampling instant $T_F$ takes place, the associated polarity sample is correctly stored in DFF 23.

Control means 23 comprises a memory circuit 50 having three inputs: "step", "direction" and "clock". Input "direction" is connected direct to the output of DFF 31 to receive the control signal; input "step" is coupled to this output by means of pulse generator 51 and divide-by-32 divider 52; and input "clock" is coupled to the adjustable divider 3 to receive pulse T13. Pulse generator 51 applies a single reset pulse to divide-by-32 divider 52 in response to every transition in the control signal and, after 32 pulses T12, divide-by-32 divider 52 applies a pulse to the input "step" so that this divide-by-32 divider is reset with each reset pulse coming from pulse generator 51. Memory circuit 50 has five outputs: LEFT, CENTRE, RIGHT, ÷15 and ÷17. Output LEFT is connected to AND gate 53 which is furthermore coupled to adjustable divider 3 to receive pulse T8. Output CENTRE is connected to AND gate 54 which is furthermore coupled to adjustable divider 3 to receive pulse T9 and output RIGHT is connected to AND gate 55 which is furthermore coupled to adjustable divider 3 to receive pulse T10. The three outputs of these three AND gates 53, 54 and 55 are connected to OR gate 56 whose output forms the output of the control means 10. Through this output sampling instant $T_F$ is generated which, in dependence on the output signal of memory circuit 50, coincides with pulse T8, T9 or T10 of adjustable divider 3. The ÷15 and ÷17 outputs are coupled to adjustable divider 3 which divides by a factor of 15, 16 or 17 in dependence on the output signal of the memory circuit 50.

The operation of memory circuit 50 is represented in Table 1. Such a memory circuit 50 may be realised in various ways. A single exemplary embodiment in which flip-flops are used will be discussed with reference to FIG. 4.

TABLE 1

| present state | inputs step, direction next state | | | | outputs | | | | |
|---|---|---|---|---|---|---|---|---|---|
| | 00 | 01 | 11 | 10 | LEFT | CENTRE | RIGHT | ÷15 | ÷17 |
| A | B | B | A | C | 1 | 0 | 0 | 1 | 0 |
| B | B | B | A | C | 1 | 0 | 0 | 0 | 0 |
| C | C | C | B | D | 0 | 1 | 0 | 0 | 0 |
| D | D | D | C | E | 0 | 0 | 1 | 0 | 0 |
| E | D | D | C | E | 0 | 0 | 1 | 0 | 1 |

TABLE 1-continued

| present state | inputs step, direction next state | | | | outputs | | | | |
|---|---|---|---|---|---|---|---|---|---|
| | 00 | 01 | 11 | 10 | LEFT | CENTRE | RIGHT | ÷15 | ÷17 |
| E | D | D | C | E | 0 | 0 | 1 | 0 | 1 |

Table 1 is to be intepreted as follows. Supposing the present state is state C. Corresponding to this is an initial state of memory circuit 50 at which the output CENTRE has the logic value "one" (FIG. 3 shows that the second sampling instant $T_F$ then coincides with pulse T9). If, subsequently, the logic values "one" and "zero" are applied to the respective inputs "step" and "direction", the next state will be state D. Corresponding to this is an initial state in which the output LEFT has the logic value "one" ($T_F$ then coincides with pulse T8). If, thereafter, the logic value "zero" is applied to the input "step" and input "direction", the next state remains the state B, and so on. Of course both sampling instants can be shifted in dependence on three or more different values of the control signal as well. In this case Table 1 and memory circuit 50 should be extended accordingly.

The operation of the exemplary embodiment represented in FIG. 3 is the following. The biphase coded signal is applied to input terminal 2 and sampled by sampling circuit 20 at the sampling instants $T_B$ and $T_F$. $T_B$ coincides with pulse T5 from adjustable divider 3, and $T_F$ coincides with pulse T8, T9 or T10 depending on the initial state of the memory circuit 50. Assuming that the output CENTRE of this memory circuit has the logic value "one", $T_F$ then coincides with pulse T9 (state C in Table 1). The polarity samples taken at the two sampling instants $T_B$ and $T_F$ are stored in DFF 22 and DFF 23 respectively, and applied to EXOR gate 30 of comparator circuit 4. Let it be assumed that both $T_B$ and $T_F$ are situated to the left of point p of the eye pattern of the biphase signal, the two polarity samples will then have the logic value "one" and EXOR gate 30 will produce an output signal having the logic value "zero" to be stored in DFF 31 and applied to VCO 5 through low-pass filter 6 and to control means 10. Consequently, the 16×higher oscillator frequency of VCO 5 will be in synchronism with the symbol interval rate of the biphase signal. Since it has been assumed that memory circuit 50 is in state C, the two ÷15 and ÷17 outputs will have the logic value "zero" and adjustable divider 3 will divide by the factor of 16 in response thereto. During this operation a frequency occurs whose period is equal to the symbol interval of the biphase signal and adjustable divider 3 generates the equidistant pulses T1 to T16 in each period.

The signal coming from DFF 31 and having the logic value "zero" is applied direct to the input "direction" of memory circuit 50 and to pulse generator 51 which generator will not generate a reset pulse for divide-by 32 divider 52 in response thereto, which divider as a result will assume the count 1 after clock signal pulse T12 is received if the previous count is assumed to have the value 0. Divider 52 will generate a signal having the logic value "one" only when the count 32 is attained. This is not yet the case and signals having the logic value "zero" are applied to the input "step" as well as the input "direction". From Table 1 it follows that the next state of memory circuit 50 is again state C so that the logic values of the five output signals do not change. Consequently, $T_F$ continues to coincide with pulse T9 and adjustable divider 3 continues to divide by the factor of 16, so that the two sampling instants are not shifted relative to the symbol interval and the two polarity samples again have the logic value "zero". The only element that changes each next symbol interval is the count of the divide-by 32 divider 52 which is incremented each time by unity. After 32 symbol intervals this count attains the value 32 and counter 52 generates a pulse in response to which the logic value "one" is applied to the input "step". Table 1 then shows that the next state of memory circuit 50 becomes state D in which the output RIGHT adopts the logic value "one". Consequently, $T_F$ will be shifted one pulse to the right (from T9 to T10), whereas $T_B$ relative to the symbol interval remains in place (because divider 3 continues to divide by a factor of 16 since the ÷15 and ÷17 outputs in state D generate the logic value "zero"). At these sampling instants the two polarity samples still have the logic value "one" due to which EXOR gate 30 applies through DFF 31 a signal having the logic value "zero" to control means 10. For 32 symbol intervals the count of counter 52 is incremented by unity, until this count has attained the value 32 in which case a signal having the logic value "one" is applied to the input "step". Table 1 then shows that the next state becomes state E.

In state E, output RIGHT retains the logic value "one" and ÷17 output also gets the logic value "one". Consequently, divider 3 divides the oscillator frequency of VCO 5 by a factor of 17 so that the two sampling instants relative to the symbol interval are shifted to the right. Two states may occur during this operation, state I in which the second sampling instant $T_F$ is still to the left of the zero p and state II in which $T_F$ has meanwhile adopted a position to the right of the zero p as a result of the shift to the right.

In state I the polarity samples still have both the value "one" during the sampling instants that have shifted to the right, in response to which value EXOR gate 30 generates a signal having the logic value "zero". Consequently, memory circuit 50 adopts state D so that divider 3 starts to divide by 16 again. If counter 52 has attained the count of 32, memory circuit 50 again adopts state E and divider 3 divides by 17 so that the two sampling instants again move to the right relative to the symbol interval. This is continued until $T_F$ is situated slightly to the right of zero p, in which case state II is attained.

In state II, $T_B$ is situated to the left and $T_F$ slightly to the right of zero p and the polarity samples taken at these instants have opposite values. Consequently, a logic "one" is applied to the input "direction" and a logic "zero" is applied to the input "step" and memory circuit 50 adopts state D: divider 3 then divides by 16 so that the two sampling instants are no longer shifted relative to the symbol interval. After 32 symbol intervals counter 52 attains the count of 32 and a logic "one" is applied to both the input "step" and the input "direction" as a result of which the state C is attained: $T_F$ is then shifted one pulse to the left and coincides with pulse T9, whereas $T_B$ remains in its place. If $T_F$ has now ended up to the left of zero p, state D is again attained after 32 symbol intervals so that $T_F$ is shifted to the right. If $T_F$ in state C is still on the right of zero p, the state B is attained after 32 symbol intervals so that $T_F$ is again shifted one pulse to the right and coincides with T8, so that $T_F$ has certainly ended up to the right of zero p. Subsequently, state C is again attained so that $T_F$ is shifted to the right and so on.

In this manner it is avoided that divider 3 is constantly to divide by 15 or 17 with $T_B$ also being shifted. Once it has reached the neighbourhood of zero p, $T_F$ assumes an idle state (i.e. moving on the left and right of the zero by coinciding with pulse T8, T9 or T10), whereas $T_B$ remains in its place (by coinciding with T5, while the divider 3 constantly divides by the factor of 16). Not until $T_F$ is no longer situated in the neighbourhood of the zero p will the position of $T_B$ and $T_F$ be corrected by the modification of the divisor. As a rule, this will happen only sporadically.

Figure 4:
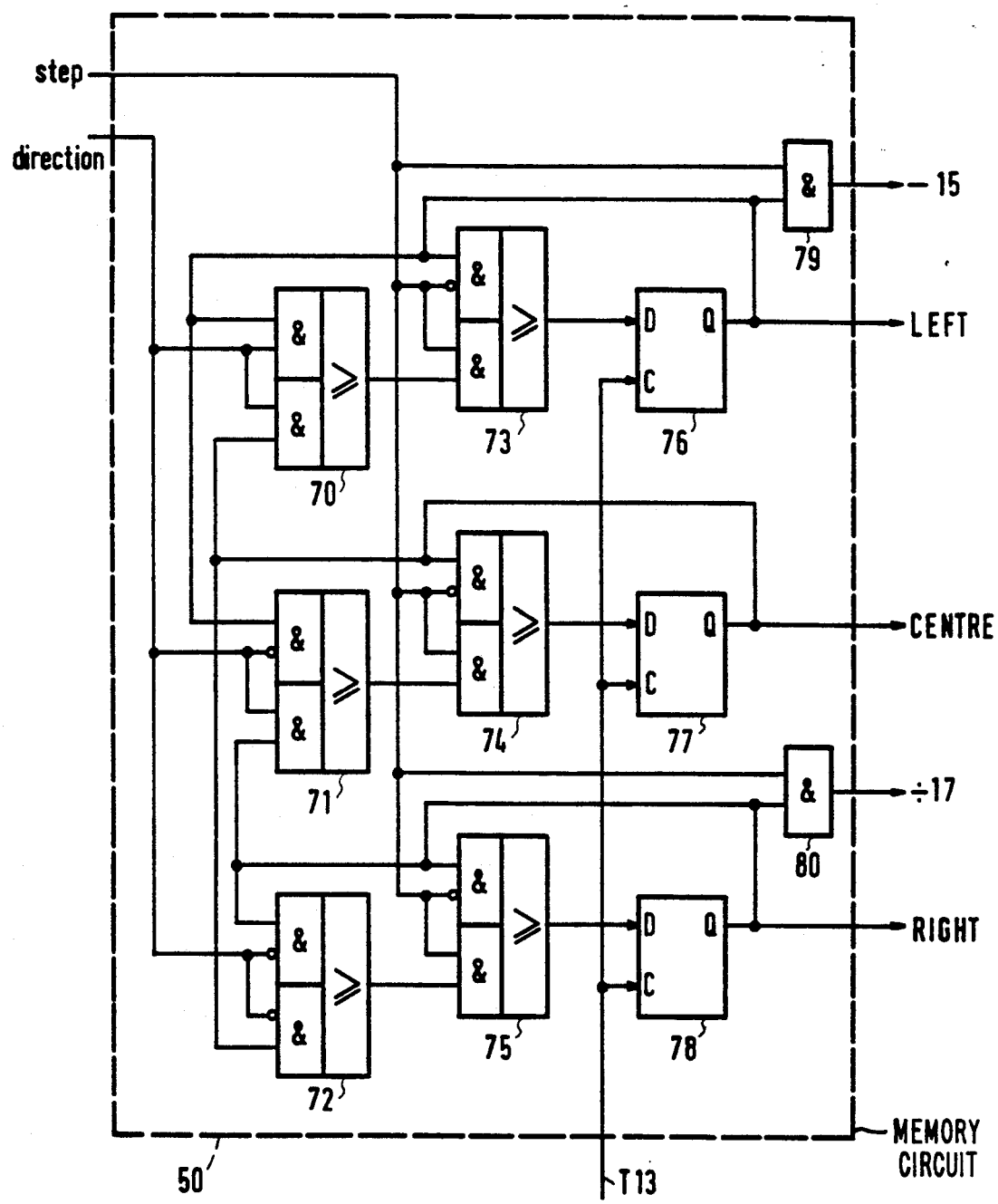
FIG. 4 shows a block diagram of an exemplary embodiment of the control means of the arrangement according to the invention.

FIG. 4 shows an exemplary embodiment of the memory circuit 50 represented in FIG. 3, whose operation is described in Table 1. Memory circuit 50 comprises 6 combinatorial circuits, that is to say, the ANDANDOR gates 70, 71, 72, 73, 74 and 75. An ANDANDOR gate is constituted by two AND gates which have each two inputs, whose outputs are connected to an OR gate, and thus has a first, a second, a third and a fourth input. The output signal of an ANDANDOR gate has the logic value "one" if from at least a single AND gate both inputs simultaneously receive a signal having a logic value "one". Naturally, an inverting input is then to receive a logic "zero". Memory circuit 50 further includes three DFFs 76, 77 and 78 whose input "clock"s are coupled to divider 3 to receive pulse T13 and whose outputs form the output LEFT, the output CENTRE and output RIGHT respectively. The input of DFF 76, 77 and 78 is connected to the output of ANDANDOR gate 73, 74 and 75 respectively, of which a first input is connected to the output of DFF 76, 77 and 78 respectively. A second input (inverting) of each ANDANDOR gate 73, 74 and 75 is connected to the third input and to the input "step" and a fourth input is connected to the output of the ANDANDOR gate 70, 71 and 72 respectively. A first input of the ANDANDOR gate 70 is connected to the first input of ANDANDOR gate 73 and to a first input of ANDANDOR gate 71. A second input of the ANDANDOR gate 70 is connected to the input "direction" and to a second input (inverting) of both the ANDANDOR gate 71 and ANDANDOR gate 72. A third input of the ANDANDOR gate 70 is connected to the second input and a fourth input is connected to the first input of ANDANDOR gate 74 and to a fourth input of ANDANDOR gate 72. A third input of ANDANDOR gate 71 is connected to the second input (inverting) and a fourth input is connected to the first input of ANDANDOR gate 75 and to a first input of ANDANDOR gate 72 whose second input (inverting) is connected to a third input (inverting). Memory circuit 50 further comprises two AND gates 79 and 80 having each two inputs, one input of each AND gate 79, 80 being connected to the input "step". The other input of AND gate 79 is connected to the output LEFT and the other input of the AND gate 80 is connected to the output RIGHT. The outputs of the respective AND gates 79 and 80 form the ÷15 and ÷17 outputs of the memory circuit 50.

The operation as represented in Table 1 is the following. Let it be assumed that a signal having the logic value "one" is available at the output CENTRE at a specific moment (state C in Table 1) and signals having a logic value "zero" are applied to the input "step" and the input "direction". Only the ANDANDOR gates 72 and 74 will then generate a signal having the logic value "one", because only the output CENTRE had the logic value "one". With pulse T13 a signal having the logic value "one" is then applied only to DFF 77 so that only the output CENTRE carries the logic value "one". The state then remains unchanged. Table 1 also shows the following: if both the input "step" and the input "direction" receive the logic value "zero" in state C, the next state will again be state C.

If counter 52 attains the count 32, a pulse signal having the logic value "one" will be applied to the input "step". As a result, the ANDANDOR gates 72 and 75 will generate a signal having the logic value "one" so that with the next pulse T13 only DFF 78 at the output RIGHT will generate a signal having the logic value "one". This corresponds to the state D of Table 1: If a signal having the logic value "one" is applied to the input "step" and a signal having the logic value "zero" to the input "direction" in state C, the next state will be state D in which thus only the output RIGHT will generate a signal having the logic value "one".

I claim:

1. A method of synchronizing a clock signal to a biphase modulated digital signal having substantially identical symbol intervals, comprising:
   sampling said biphase signal in each symbol interval at respective first and second sampling instants to determine the polarity of the biphase signal at the respective instants and provide two corresponding polarity samples,
   comparing said two polarity samples from one symbol interval with each other,
   generating a control signal responsive to the comparison, said control signal having one sense if said two polarity samples from one symbol interval are equal, and the other sense if said two polarity samples are unequal,
   responsive to said control signal having said one sense, shifting both said sampling instants relative to the biphase signal during a next symbol interval in a first direction; and responsive to said control signal having said other sense, shifting both said sampling instants relative to the biphase signal during said next symbol interval in a second direction opposite said first direction,
   characterized in that, responsive to said control signal having a given current value and at least one given previous value, the position of said first sampling instant relative to the biphase signal is fixed, and said second sampling instant is shifted relative to said biphase signal.

2. A method as claimed in claim 1, characterized in that, responsive to said control signal having said given current value and said at least one given previous value, said second sampling instant is selected from a group of instants which are predetermined relative to said first sampling instant.

3. A method as claimed in claim 1, characterized in that said given current value and said at least one given previous value are selected such that said second sampling instant is in the neighborhood of a biphase signal zero crossing.

4. A method as claimed in claim 1, characterized in that, responsive to said control signal having said given current value and at least one given previous value, the position of said second sampling instant relative to the biphase signal is alternately just before and just after a zero crossing of said biphase signal during successive symbol intervals of the biphase signal.

5. An apparatus for generating a clock signal from a biphase modulated digital signal having substantially identical symbol intervals, comprising:
   means for determining the polarity of said biphase signal at first and second sampling instants during each symbol interval of said biphase signal, and providing respective first and second polarity samples,
   means for comparing the first and second polarity samples from each respective symbol interval and generating a control signal having a first value if said first and second polarity samples are equal, and having a second value if said first and second polarity samples are unequal,
   means for logically combining the values of said control signals from two successive symbol intervals so as to generate an adjustment signal indicative of said second sampling instant occurring before, substantially coinciding with, or occurring after the zero crossing of the biphase signal, and
   shifting means, responsive to said adjustment signal being indicative of said second sampling instant occurring before or after said zero crossing, for shifting the position of said first and second sampling instants in the symbol interval following said two successive symbol intervals while maintaining the interval between said first and second sampling instants constant; and responsive to said adjustment signal being indicative of said second sampling instant substantially coinciding with said zero crossing, for shifting the position of said second sampling instant in said symbol interval following said two successive symbol intervals while maintaining the position of said first sampling instant fixed with respect to the biphase signal.

6. An apparatus as claimed in claim 5, characterized in that said means for logically combining comprises a memory circuit.

7. An apparatus as claimed in claim 6, characterized in that said memory circuit comprises a combining circuit and a flip-flop.

8. An apparatus as claimed in claim 6, characterized in that said shifting means comprises a frequency controlled oscillator having an input receiving said control signal, and an output; means for generating a pulse at said first and second sampling instants, having an input coupled to said control signal, and an output coupled to said memory circuit; and an adjustable divider receiving an said output of said oscillator and control signals from said memory circuit, and providing timing signals to said memory circuit and said means for determining.

9. An apparatus as claimed in claim 8, characterized in that, responsive to said second sampling instant substantially coinciding with the zero crossing of the biphase signal, said shifting means adjusts the second sampling instant to be alternately slightly before and slightly after the zero crossing.

10. An apparatus as claimed in claim 5, wherein
   said means for determining has a control input and a sampling output,
   said means for comparing has a comparator input coupled to said sampling output, and a comparator output,
   said apparatus comprises a frequency controlled oscillator having an oscillator input coupled to the comparator output, and an oscillator output; and means for generating a pulse at the first and second sampling instants, having a generator input coupled to said oscillator output, a generator control input coupled to said comparator output, and a generator output coupled to said control input, the direction in which the pulses are shifted when said second instant occurs before or after said zero crossing being responsive to the comparator output signal applied to said generator control input, characterized in that said means for logically combining and said shifting means together comprise:

a first input coupled to the comparator output, for receiving said control signal, a second input coupled to the generator output for receiving said pulses, a first output coupled to said generator control input, for coupling the comparator output to said generator control input, a second output coupled to a control input of the means for determining, and a memory circuit coupled to said first input, for generating said adjustment signal at the first output responsive to a current value and at least one previous value of the control signal, responsive to said adjustment signal at the first output being indicative of said second instant substantially coinciding with said zero crossing, said means for generating generates said pulse for the first sampling instant at a position fixed with respect to the biphase signal, and generates said pulse for the second sampling instant at a position shifted relative to the biphase signal.

11. An apparatus as claimed in claim 10, characterized in that said memory circuit comprises at least a single combinatorial circuit and a flip-flop, said flip-flop having:

an input forming the first input of the control means via the combinatorial circuit, an output forming the control means first output via a logic circuit, coupled to the control means second output, and an input clock coupled to the generator output.

* * * * *